United States Patent [19]

Swenson et al.

[11] Patent Number: 5,682,735
[45] Date of Patent: Nov. 4, 1997

[54] GEAR DRIVEN ROLLER BRUSH

[75] Inventors: Phillip Orland Swenson, Beaver Dam; Ronald Lee Reichen, Horicon; Larry Neil Smith, Beaver Dam, all of Wis.; Donald Emil Niosi, Prior Lake, Minn.

[73] Assignee: Deere & Company, Moline, Ill.

[21] Appl. No.: 653,534

[22] Filed: May 24, 1996

[51] Int. Cl.⁶ ................................................. A01B 55/28
[52] U.S. Cl. .................... 56/249; 56/7; 56/17.1
[58] Field of Search .................... 56/6, 7, 16.9, 16.6, 56/249, DIG. 12, 13.6, 17.1; 15/79 R, 79 A, 82, 83

[56] References Cited

U.S. PATENT DOCUMENTS

| | | | |
|---|---|---|---|
| 2,043,148 | 6/1936 | Blondeau | 56/249 |
| 3,106,813 | 10/1963 | Strasel | 56/249 |
| 4,021,996 | 5/1977 | Bartlett et al. | 56/249 X |
| 4,878,340 | 11/1989 | Roy et al. | 56/249 |
| 4,991,384 | 2/1991 | Steckly | 56/202 |
| 5,228,277 | 7/1993 | Smith et al. | 56/249 X |

OTHER PUBLICATIONS

Deere & Co., Parts Catalog PC2276, "Power Brush For Use Without Greens Tender Conditioner", 2 pages 85–18 and 85–19, dated Jan. 1, 1994, published in the U.S.A.

Deere & Co., Parts Catalog PC2276, "Power Brush For Use With Greens Tender Conditioner", 2 pages 85–20 and 85–21, dated Jan. 1, 1992, published in the U.S.A.

Deere & Co., John Deere Golf & Turf Sales Manual, "2243 Professional Greens Mower", 1 p. 10–300–3, datd Feb. 1995, published in the U.S.A.

Deere & Co., John Deere Horicon Works, "Product Services Information–Installation Instructions, BM17662 Installing Power Brush Kit (2243 Professional Greensmower) MT175", 4 pages, dated Feb. 1992, published in the U.S.A.

Deere & Co., John Deere Horicon Works, "Product Services Information–Installation Instructions, BM17663 Installing Power Brush Kit On Units Equipped With Greens Tender-Conditioner On 2243 Professional Greensmower" MT176, 3 pages, dated Feb. 1992, published in the U.S.A.

*Primary Examiner*—Terry Lee Melius
*Assistant Examiner*—Robert Pezzuto

[57] ABSTRACT

A drive mechanism for a shiftable reel mower brush, the mechanisms including a drive gear driven by the power source, a driven gear fixed with the brush, and an idler gear for transmitting rotational motion from the drive gear to the driven gear. The idler gear is shiftable to remain meshed with the drive gear and driven gear as the brush shifts. A first pivot member is pivotal about the drive gear's axis of rotation, and the idler gear is operatively coupled with the first pivot member for keeping the idler gear in mesh with the drive gear when the brush shifts. A second pivot member is pivotal about the driven gear's axis of rotation, and the idler gear is coupled with the second pivot member for keeping the idler gear in mesh with the driven gear when the driven gear shifts relative to the drive gear.

10 Claims, 4 Drawing Sheets

GEAR DRIVEN ROLLER BRUSH

BACKGROUND OF THE INVENTION

This invention relates to mechanisms for rotatively driving a brush which wipes debris such as grass clippings from a ground engaging roller of a reel mower cutting unit.

Conventional reel type cutting units include a frame which rotatably supports a central shaft of a cylindrical cutting reel. Grass is cut by a shearing action between the rotating blades of the reel and a stationary bedknife mounted to the frame. These reel mowers provide an accurate, high quality cut and are typically used to mow grass in highly manicured areas such as golf courses.

Reel mowers typically include front and rear ground engaging rollers which support the cutting unit frame above the ground during mowing operations. The rollers are typically vertically adjustable with respect to the cutting unit frame for adjusting the height at which the cutting unit is supported above the ground, which allows the operator to adjust the height at which grass is cut by the reel. Grass clippings and other debris tend to accumulate on the rear roller, which can cause the effective diameter of the rear roller to increase and thereby support the cutting unit at a higher position. The accumulation of clippings can thereby affect the height at which grass is cut and negatively effect cut quality. Furthermore, if clumps of material accumulate on the roller, then the frame may be supported in a non-level fashion which also negatively affects the cut quality.

Therefore, some reel mowers are provided with a roller brush that clears debris and grass clippings from the rear roller. The brush typically includes a laterally extending central shaft rotatably supported by the frame proximate the rear roller. Bristles extend outwardly from the central shaft and engage the rear roller for cleaning debris from the surface of the roller. A drive mechanism is typically provided which causes the roller brush to rotate. A reel pulley is coupled with the outer end portion of the central shaft of the cutting reel. A drive belt is driven by the reel pulley and engages a brush pulley coupled with the shaft of the roller brush. As the reel rotates during mowing operation the reel pulley and drive belt rotate therewith. The brush pulley receives the rotational motion from the belt and transmitts it to the roller brush. The bristles of the rotating roller brush engage the rear roller and thereby agresssively clear debris from the surface of the roller.

The roller brush and roller are typically mounted to the same mounting plate, and therefore when the mounting plate is shifted up or down for adjusting the position of the roller during cutting height adjustments the brush will shift with the rear roller so that the bristles will continue to engage the roller even after the roller is shifted to adjust the height of cut. The brush is typically mounted within slots formed in the mounting plate so that the brush can be adjusted to the proper position with respect to the rear roller. The brush can be shifted within these slots as the bristles wear and become shorter. This allows the operator to maintain the bristles of the brush in engagement with the surface of the roller even after the bristles wear down and become shorter.

Shifting of the brush and brush pulley with the roller as the cutting height is adjusted can cause the distance between the brush pulley and reel pulley to change. This will cause the belt to either become tighter or looser, which can negatively affect the performance of the drive system. Some reel mowers provide a brush that swings in an arc during cutting height adjustments so that the distance between the brush pulley and reel pulley remains constant. This allows the belt to remain at a constant tension and generally enhances belt life and performance. Some mechanisms which swing the brush in an arc do not automatically adjust the position of the brush when the height of cut is adjusted, and therefore require the operator to perform additional steps to properly adjust the position of the brush. The mechanisms which swing the brush in an arc can also be relatively complex and include numerous parts which increases the cost of manufacture and assembly. Furthermore, belt drive systems are prone to slippage, especially in wet environments. As the belts stretch and wear they tend to require maintenance or replacement, which can be costly and time consuming.

It would therefore be desirable to provide a mechanism for driving a roller brush which compensates for shifting of the brush when the height of cut is adjusted or when the brush is shifted to compensate for bristle wear. It would be desirable for such a mechanism to be relatively simple in construction and include relatatively few parts so that manufacture and assembly are simple and inexpensive. It would be desirable for such a mechanism to positively and agressively drive the roller brush and eliminate slippage, even when operating in a wet environment. It would also be desirable for such a mechanism to be relatively maintenance free.

SUMMARY OF THE INVENTION

The preferred embodiment of the present invention provides a mechanism for rotatively driving a brush which is adapted for sweeping grass clippings and other debris from a ground engaging rear roller of a reel mower cutting unit. The brush shifts vertically such as when an operator adjusts the cutting height of the cutting unit or when the brush is shifted closer to the roller to compensate for bristle wear. A drive gear is operatively coupled with the central shaft of the cutting reel. Teeth of an idler gear engage the drive gear and transmit rotational power to a driven gear which is fixed with a central shaft of the brush. A first pivot member is adapted to pivot about the axis of the drive gear. The idler gear is mounted to an end portion of the first pivot member, and is thereby held by the first pivot member in meshed relation with the teeth of the drive gear. A second pivot member is adapted to pivot about the axis of the driven gear. The idler gear is also mounted to the end portion of the second pivot member and is thereby held by the second pivot member in meshed relation with the teeth of the driven As the brush shifts up and down, the distance between the driven gear and the drive gear changes. As this distance changes, the first and second pivot members pivot with respect to one another and continue to maintain the idler gear in mesh with the drive and driven gears. The present invention thereby provides a geared mechanism for driving the roller brush and which compensates for vertical shifting of the brush.

DESCRIPTION OF THE PREFERRED EMBODIMENT

Figure 1:
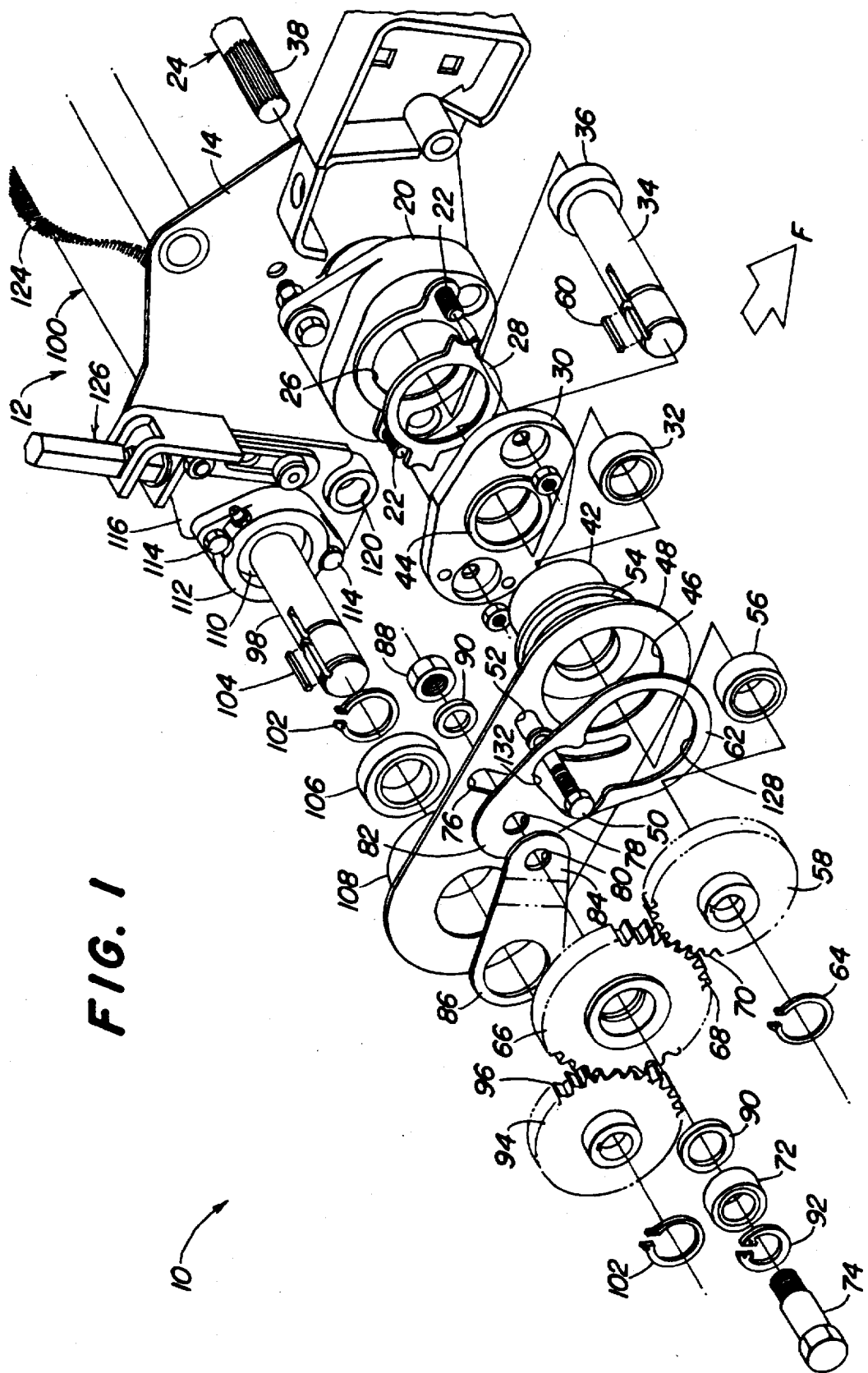
FIG. 1 is an exploded view of the roller brush gear drive mechanism according to the present invention.
Figure 4:
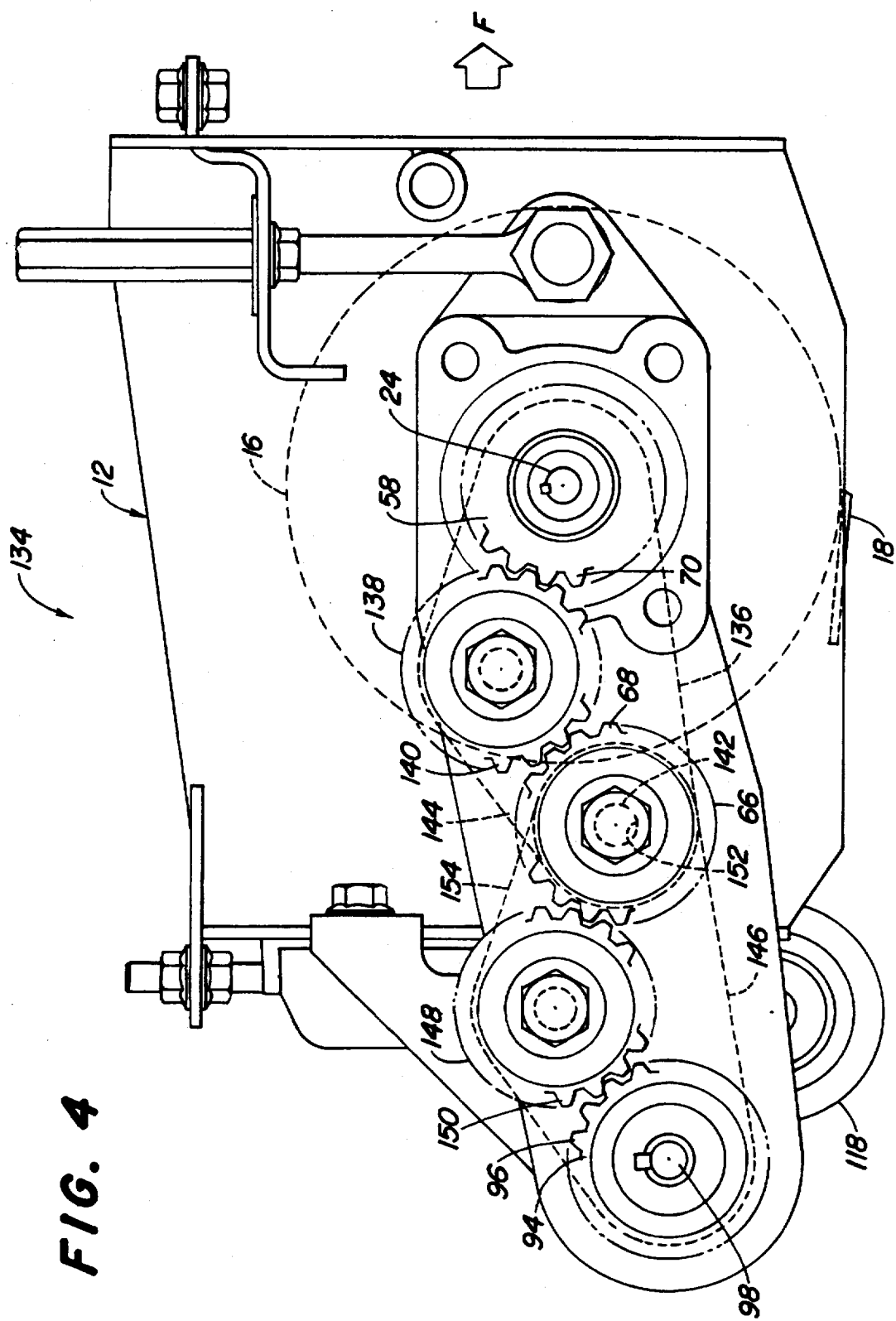
FIG. 4 shows an alternative embodiment of the present invention which includes intermediate gears engaged with the idler gear and mounted with the first and second pivot members.

Referring now to FIGS. 1, there is shown an exploded view of a roller brush driving mechanism 10 according to the present invention. A reel mower cutting unit 12 includes a frame 14 which operatively supports a cylindrical cutting reel 16 which rotates in close proximity to a bedknife 18 to cut grass with a shearing action in conventional fashion. The cutting reel 16 and bedknife 18 are shown in FIG. 4. The cutting reel 16 is rotatively driven by a hydraulic motor driven by a vehicle power source. A reel support housing 20 as seen in FIG. 1 is fixed as by bolts 22 to the frame 14 of the cutting unit 12. A central reel shaft 24 is received within an opening 26 in the reel support housing 20. A spacer 28 is positioned between the reel support housing 20 and an end cap 30 bolted to the reel support housing 20. A bearing 32 positioned within the opening in the end cap 30 supports a drive hub assembly 34. The drive hub assembly 34 includes a splined opening 36 which receives the splined end portion 38 of the central shaft 24 of the cutting reel 16. The inner diameter of a stepped spacer 42 fits over a flange 44 defined by the end cap 30. A first opening 46 of a brush mount bracket 48 loosely fits around the outer end of the stepped spacer 42. A shoulder bolt 50 is received by a slot 52 in the brush mount bracket 48 and is abutable with the brush mount bracket 48 to help secure the bracket 48 in its proper positon. The stepped spacer 42 includes a flange 54 against which the brush mount bracket 48 is abutable. Another bearing 56 positioned within the stepped spacer 42 helps support the end portion of the drive hub assembly 34. A drive gear 58 is received by the end of the drive hub assembly 34 and is engaged by a key 60 which causes the drive gear 58 to rotate with the drive hub assembly 34. A first pivot plate member 62 is loosely confined between the drive gear 58 and the brush mount bracket 48. A snap ring 64 holds the drive gear 58 in position on the end of the drive hub assembly An idler gear 66 includes teeth 68 which engage the teeth 70 of the drive gear 58. The idler gear 66 rides on a bearing 72 that rotatively supports the idler gear 66 on a shoulder bolt 74. The shoulder bolt 74 defines the axis of rotation of the idler gear 66, and is received within a slot 76 in the brush mounting bracket 48. The shoulder bolt 74 is also received in openings 78 and 80 in end portions 82 and 84 of the first pivot member 62 and a second pivot member 86. A nut 88, washers 90 and snap ring 92 help keep these parts assembled on the shoulder bolt 74.

Figure 2:
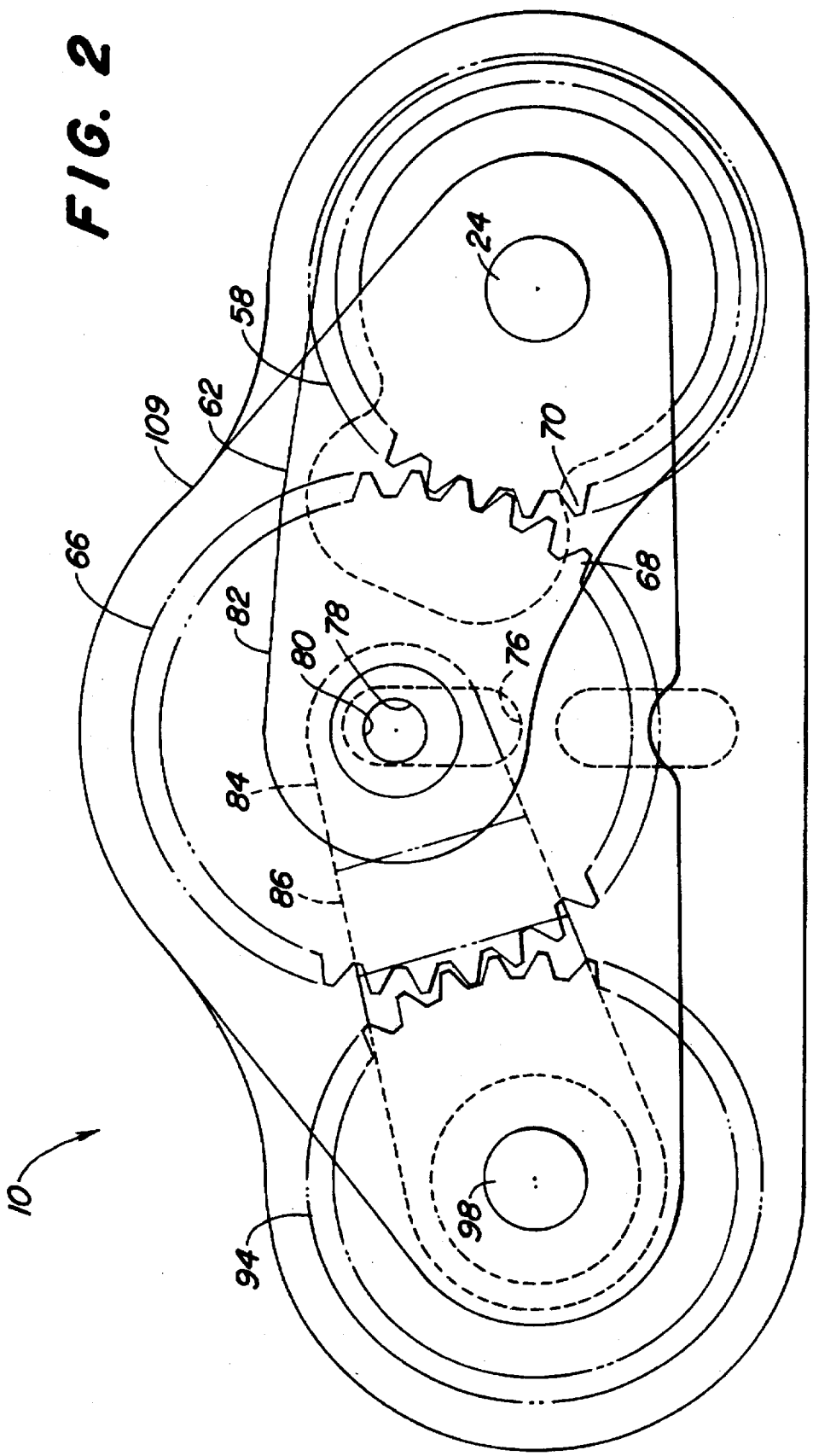
FIG. 2 is a partial view of the drive gear, idler gear and driven gear, and the first and second pivot members according to the present invention.

A driven gear 94 includes teeth 96 which engage the teeth 68 of the idler gear 66. The driven gear 94 receives the end portion of a central shaft 98 of a roller brush 100 which defines the axis of rotation of the driven gear 94. Snap rings 102 help retain the various parts on the end portion of the brush's central shaft 98. A key 104 engages the central shaft 98 and the driven gear 94 for causing the central shaft 98 to rotate with the driven gear 94. A bearing 106 which receives the central shaft 98 is positioned within a hub 108 fixed with the brush mount bracket 48. The second pivot member 86 is also pivotally received by the central shaft 98 of the the brush 100. A cover 109, shown in FIG. 2, generally encloses the drive mechanism 10.

Figure 3:
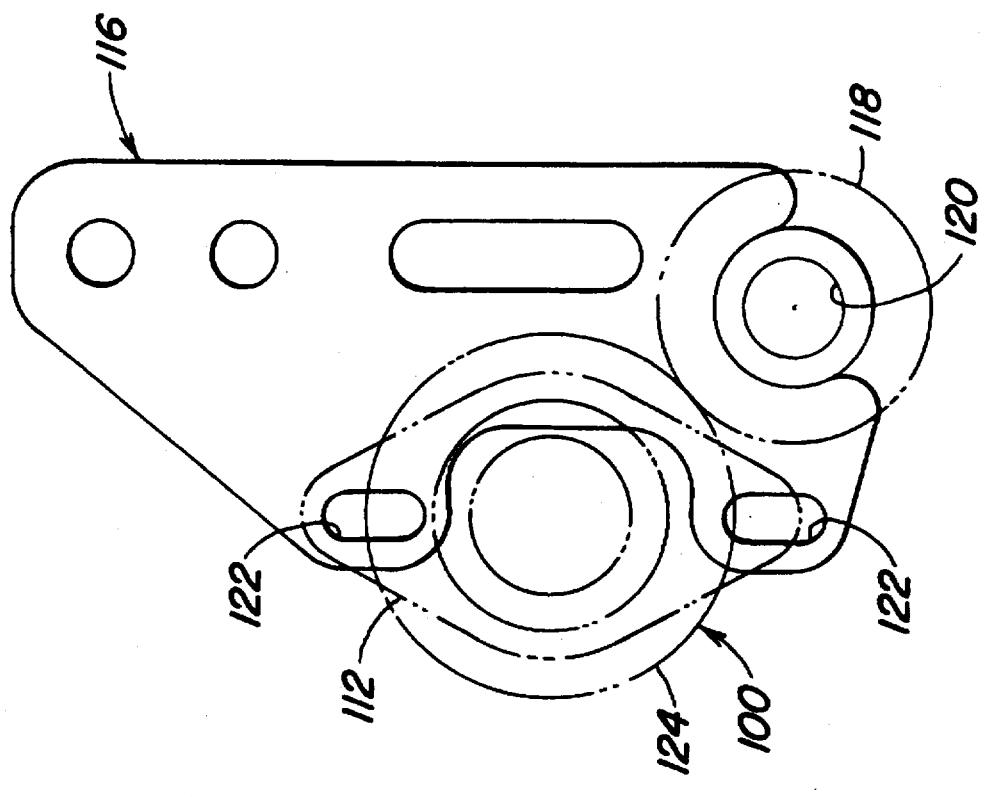
FIG. 3 is a view of the support plate to which the rear roller and brush are mounted.

As seen in FIG. 1, the central shaft 98 is rotatably received by a bearing 110 held by a cast housing 112. A pair of bolts 114 couple the cast housing 112 to a support bracket 116. A rear roller 118, as best seen in FIG. 3, is operatively mounted within a lower opening 120 in the support bracket 116. The bolts 114 are received in slots 122 formed in the support bracket 116 which allow the bolts 114 to be loosened and the brush 100 shifted up or down with respect to the support bracket 116 as the brushes bristles 124 wear. The bristles 124 can thereby be maintained in constant engagement with the rear roller 118 even after the bristles 124 wear. The support bracket 116 is mounted to the cutting unit frame 14 by a conventional height adjustment mechanism 126. The height adjustment mechanism 126 can be manipulated by an operator to adjust the vertical position of the bracket 116 with respect to the frame 14 to thereby adjust the position of the roller 118 and the height at which the frame 14 is held above the ground. The height at which the cutting unit 12 cuts grass is thereby adjusted.

Next, the operation of the present invention will be discussed in greater detail. The brush 100 and its bristles 124 are operatively mounted to the support bracket 116 for engaging the rear roller 118 mounted to the rear of the cutting unit 12. The brush 100 thereby wipes or clears debris such as grass clippings from the surface of the roller 118. This allows the roller 118 to support the cutting unit 12 at a constant predetermined height above the ground for a quality cut. When the operator wishes to adjust the cutting height, he will manipulate the cutting height adjustment mechanism 126 at the rear of the cutting unit 12. This will vertically shift the support bracket 116 relative to the cutting unit frame 14, thereby altering the height at which the cutting unit 12 is carried above the turf. The brush 100 is also mounted to the support bracket 116 and will therefore shift with the rear roller 118 during cutting height adjustments. As the brush 100 shifts vertically during cutting height adjustments, the central shaft 98 and driven gear 94 shift therewith. The drive gear 58 remains stationary with respect to the cutting unit 12 during cutting height adjustments. Therefore, during cutting height adjustments the driven gear 94 will shift with respect to the drive gear 58, causing the distance between the driven gear 94 and the drive gear 58 to change.

The present invention is adapted to accomodate this shifting of the driven gear 94 relative to the drive gear 58. The teeth 68 of the idler gear 66 are meshed with the teeth 70 and 96 of the drive gear 58 and the driven gear 94. As the driven gear 94 shifts vertically, the idler gear 66 will shift slightly and remain in mesh with both gears 58 and 94. For example, as the driven gear 94 shifts downwardly with respect to the drive gear 58 when the operator is increasing the cutting height, the idler gear 66 will tend to drop down due to the force of gravity so that the teeth 68 of the idler gear 66 remain in mesh with both the drive gear 58 and the driven gear 94. When the driven gear 94 shifts upwardly with respect to the drive gear 58 as the operator is decreasing the cutting height, the idler gear 66 will be pressed upwardly by the driven gear 94 and remain in mesh with both the drive gear 58 and driven gear 94.

However, rotation of the gears 58 and 94 during operation will apply forces to the idler gear 66 that will tend to urge the idler gear 66 away from engagement with the drive and driven gears 58 and 94. The present invention therefore provides a mechanism for insuring that the idler gear 66 remains meshed with both the drive and driven gears 58 and 94 during operation regardless of the position of the driven gear 94 after the cutting height has beed adjusted. The first pivot member 62 is adapted to pivot about the drive gear's rotational axis which is defined by the hub assembly 34 and reel shaft 24. A first opening 128 pivotally receives the end portion of the stepped spacer 54. A second opening 78 at the end portion 82 of the first pivot member 62 is pivotally coupled with the shoulder bolt 74 that supports the idler gear 66. The first pivot member 62 thereby extends between the drive gear 58 and idler gear 66 and serves to maintain the idler gear 66 at a fixed distance from the axis of rotation of the drive gear 58. The first pivot member 62 keeps the idler gear 66 from shifting away from the drive gear 58 and out of engagement with the teeth 70 of the drive gear 58 during mowing operations regardless of the position of the idler gear 66 after the cutting height has been adjusted.

In similar fashion, the second pivot member 86 serves to keep the idler 66 in mesh with the driven gear 94. The second pivot member 86 includes a first opening 130 within which the central shaft 98 of the brush 100 is pivotally positioned. The outer end portion 84 of the second pivot member 86 includes a second opening 80 that pivotally receives the shoulder bolt 74 which supports the idler gear 66. The second pivot member 86 serves to hold the idler gear 66 at a constant distance from the axis of the driven gear 94 to thereby maintain the teeth 68 of the idler gear 66 in mesh with the teeth 96 of the driven gear 94 during operation regardless of the position of the idler gear 66 after cutting height adjustments. The second pivot member 86 prevents the idler gear 66 from shifting away from the driven gear 94 and out of engagement with the teeth 96 of the driven gear 94.

The first and second pivot members 62 and 86 therefore serve to maintain the drive gear 58, idler gear 66 and driven gear 94 in operative meshed engagement as the driven gear 94 shifts relative to the drive gear 58 during cutting height adjustments. As the driven gear 94 shifts relative to the drive gear 58, the idler gear 66 will shift. The first pivot member 62 allows the idler gear 66 to pivot in an arc of constant radius about the axis of rotation of the the drive gear 58. The first pivot member 62 prevents the idler gear 66 from shifting away from the drive gear's axis of rotation, and holds the idler gear 66 in mesh with the teeth 70 of the drive gear 58 as the idler gear 66 pivots. As the first pivot member 62 keeps the idler gear 66 in mesh with the drive gear 58, the second member 86 simultaneously retains the idler gear 66 in mesh with the driven gear 94. As the driven gear 94 shifts during cutting height adjustments the second pivot member 86 will pivot about the axis of the driven gear 94. The idler gear 66 coupled to the outer end portion 84 of the second pivot member 86 is thereby caused to travel in an arc about the axis of the driven gear 94. The second pivot member 86 insures that the arc through which the idler gear 66 swings has a a constant radius about the axis of rotation of the driven gear 94. By holding the idler gear 66 at a constant radius from the axis of the driven gear 58, the second pivot member 86 prevents the idler gear 66 from shifting away from the driven gear 94 and holds the idler gear 66 in mesh with the teeth 96 of the driven gear 94 as the idler gear 66 pivots about the driven gear 94. The first and second pivot members 62 and 86 therefore pivot with respect to each other like a hinge to maintain the drive gear 58, idler gear 66 and driven gear 94 in proper meshed relation as the distance between the driven gear 94 and drive gear 58 changes during cutting height adjustments.

The brush mount plate 48 is mounted to pivot with respect to both the rotational axis of the drive gear 58 and the rotational axis of the driven gear 94. Abutment of the first and second pivot members 62 and 86 against the brush mount plate 48 helps maintain the pivot plates 62 and 86 in their proper alignment and position during operation. The brush mount bracket 48 accomodates the shifting of the driven gear 94 relative to the drive gear 58 during cutting height adjustments by providing a first opening 46 that loosely fits around the stepped spacer 42. Enough clearance is provided between the stepped spacer 42 and the inner diameter of the first opening 46 in the brush mount bracket 48 to allow the driven gear 94 to shift toward or away from the drive gear 58 during cutting height adjustments. The clearance between the first opening 46 and the stepped spacer 42 allows the brush mount bracket 48 to shift relative to the axis of the drive gear 58 as the driven gear 94 shifts during cutting height adjustments.

As the distance between the drive gear 58 and driven gear 94 changes during cutting height adjustments, the idler gear 66 will shift up and down between the drive and driven gears 58 and 94. The idler gear 66 is mounted on a shoulder bolt 74 which is coupled to the first and second pivot members 62 and 86. The shoulder bolt 74 is also received within a generally vertical slot 76 formed in the brush mount bracket 48. The slot 76 allows the shoulder bolt 74 to shift up and down with the idler gear 66 as the cutting height is adjusted.

The first opening 128 in the first pivot member 62 includes a relief portion 132 within which the shoulder bolt 50 is positioned. The shoulder bolt 50 helps hold the brush mount bracket 48 in place. The relief portion 132 is sized substantially larger than the shoulder bolt 50 such that clearance is provided between the edges of the relief section 132 and the shoulder bolt 50 as the first pivot member 62 pivots about the axis of the drive gear 58 and relative to the stationary shoulder bolt 50.

The present invention is shown on the right side of a reel mower cutting unit 12, but is designed such that the same parts can be used on the left side of a cutting unit 12.

The cast housing 112 that supports the brush 100 is mounted within slots 122 formed in the support plate 116 such that an operator can selectively adjust the position of the brush 100 as the bristles 124 wear after long periods of mowing operations. The axis of the brush 100 can thereby be shifted closer to the roller 118 so that the shorter bristles 124 will continue to contact the outer surface of the roller 118. When the brush 100 is adjusted in this manner to compensate for bristle wear, the distance between the driven gear 94 and the drive gear 58 will change. As detailed above in the description of the shifting of the driven gear 94 during cutting height adjustments, the idler gear 66 will be maintained in mesh with the drive gear 58 and driven gear 94 by the hinge-action of the first and second pivot members 62 and 86. As described above, the pivot members 62 and 86 will function to support the idler gear 66 at fixed distances from their respective axes and thereby prevent the idler gear 66 from shifting out of mesh with the teeth 70 and 96 of the drive gear 58 and driven gear 94 during operation.

Referring now to FIG. 4, there is shown an alternative embodiment 134 of the present invention. Reel mower cutting units are manufactured in a variety of shapes and sizes. The distance between the reel shaft 24 and rear roller brush 100 shown in FIG. 4 is larger than that shown in FIG. 1 such that it would be impractical to provide a single large diameter idler gear to transmit rotational power from the drive gear 58 to the driven gear 94. The embodiment shown in FIG. 4 is adapted for use with a relatively long cutting unit 12 with a relatively large distance between the reel shaft 24 and the brush shaft 98. A drive gear 58 is operatively mounted to the reel shaft 24. A first pivot member 136 is adapted to pivot about the axis of the reel shaft 24. A first intermediate gear 138 is carried by the first pivot member 136. An idler gear 66 engages the teeth 140 of the first intermediate gear 138, and is supported by a shaft 142 mounted to the end portion 144 of the first pivot member 136. A driven gear 94 is mounted to the brush's central shaft 98. A second pivot member 146 is adapted to pivot about the axis of the brush's central shaft 98, and supports at its mid-section a second intermediate gear 148. The teeth 150 of the second intermediate gear 148 engage the driven gear 94 and the idler gear 66. An opening 152 in the end portion 154 of the second pivot member 146 receives the shaft 142 of the idler gear 66.

The first and second pivot members 136 and 146 shown in FIG. 3 operate in a fashion similar to the pivot members 62 and 86 shown in FIG. 1, and function to keep the idler gear 66 a constant distance from the respective axes even when the distance between the driven gear 94 and the drive gear 58 changes such as during height of cut adjustments. Since the idler gear 66 remains at fixed distances from the axes of the drive gear 58 and driven gear 94, the intermediate gears 138 and 148 can be fixed to the respective pivot members 136 and 146. For example, the first pivot member 136 supports the idler gear 66 at a fixed distance from the axis of the reel shaft 24 and drive gear 58. The first intermediate gear 138 can therefore be mounted at a fixed location on the first pivot member 136 and remain constantly meshed with the teeth 70 and 68 of the drive gear 58 and the idler gear 66 regardless of the pivoted position of the first pivot member 136. Similarly, the second pivot member 146 functions to fix the distance at which the idler gear 66 is positioned from the axis of the brush 100 and driven gear 94. Therefore, the second intermediate gear 148 is mounted to the second pivot member 146 and remains constantly meshed with the teeth 68 and 96 of the idler gear 66 and driven gear 94. As the distance between the driven gear 94 and drive gear 58 changes, such as during cutting height adjustments, the idler gear 66 will shift, but the first and second pivot members 136 and 146 always serve to maintain the gears in meshed relation so that rotational power is transmitted from the reel shaft 24 to the brush 100.

The present invention thereby provides a mechanism 10 for driving a roller brush 100 whose position is adjustable with respect to the cutting unit 12 such as to alter the cutting height of the reel mower 12 or to compensate for bristle wear. The present invention provides an arrangement of gears whose teeth are held in meshed relation even when the gears shift with respect to each other during cutting height adjustments or adjustments to compensate for bristle wear. The gear teeth of the present invention provide for a positive transmission of rotational power from the central shaft 24 of the cutting reel 16 to the central shaft 98 of the roller brush 100, and do not allow any slippage even when operating in a wet environment. No wearable parts such as belts are utilized by the present invention, and therefore relatively little maintenance or repair is required.

I claim:

1. A mechanism for rotatively driving a roller brush which clears debris from a ground engaging roller of a reel mower cutting unit, said cutting unit including a frame and a cutting reel driven by a power source, said brush being linearly vertically shiftable with the roller as the roller is shifted linearly vertically for altering the cutting height of the cutting unit, said mechanism comprising:

a drive gear operatively driven by the power source to rotate about a drive gear axis of rotation, a driven gear to which the brush is operatively fixed for rotation therewith, said driven gear being rotatable about a driven gear axis of rotation which is linearly vertically shiftable as the brush shifts with the roller, said driven gear being linearly shiftable relative to the drive gear as the brush and roller are shifted, an idler gear meshed in driving engagement with the drive gear and driven gear for transmitting rotational motion from the drive gear to the driven gear, said idler gear being shiftable with respect to the drive gear and driven gear to remain meshed with the drive gear and driven gear as the roller is shifted, a first pivot member adapted to pivot about the drive gear axis of rotation, said idler gear being operatively coupled with said first pivot member for maintaining the idler gear in mesh with the drive gear when the driven gear shifts relative to the drive gear, and a second pivot member adapted to pivot about the driven gear axis of rotation, said idler gear being operatively coupled with said second pivot member for maintaining the idler gear in mesh with the driven gear when the driven gear shifts relative to the drive gear.

2. The invention of claim 1, wherein said drive gear is operatively coupled with a reel shaft of the cutting unit.

3. The invention of claim 1, wherein said first pivot member prevents teeth of the idler gear from shifting out of engagement with teeth of the drive gear, and said second pivot member prevents teeth of the idler gear from shifting out of engagement with teeth of the driven gear.

4. The invention of claim 1, wherein the position of the brush relative to the roller is adjustable to compensate for wear of bristles on the brush, and said driven gear shifts relative to the drive gear when the position of the brush is adjusted as the bristles wear.

5. The invention of claim 1, wherein:

the first pivot member operatively fixes the distance of the idler gear from the drive gear axis of rotation for maintaining the idler gear in meshed engagement with the drive gear as the driven gear shifts relative to the drive gear, and the second pivot member operatively fixes the distance of the idler gear from the driven gear axis of rotation for maintaining the idler gear in meshed engagement with the driven gear as the driven gear shifts relative to the drive gear.

6. The invention of claim 1, wherein the brush rotates during operation about the driven gear axis of rotation.

7. The invention of claim 1, wherein the brush further includes a central shaft to which said driven gear is operatively fixed, said central shaft being adapted to rotate about the driven gear axis of rotation during operation.

8. A mechanism for rotatively driving a roller brush which clears debris from a ground engaging roller of a reel mower cutting unit, said cutting unit including a frame, a power source and a cutting reel driven by the power source and having a reel shaft which defines a cutting reel axis about which the cutting reel rotates, said brush being vertically shiftable linearly with the roller as the roller is shifted linearly vertically for altering the cutting height of the cutting unit, said mechanism comprising:

a drive gear coupled for rotation with the reel shaft to rotate about the cutting reel axis, a driven gear to which the brush is operatively fixed for rotation therewith, said driven gear being rotatable about a driven gear axis of rotation which is vertically shiftable as the brush shifts with the roller, said driven gear being shiftable relative to the drive gear as the brush and roller are shifted, an idler gear meshed in driving engagement with the drive gear and driven gear for transmitting rotational motion from the drive gear to the driven gear, said idler gear being shiftable with respect to the drive gear and driven gear to remain meshed with the drive gear and driven gear as the roller is shifted, a first pivot member adapted to pivot about the cutting reel axis, said idler gear being operatively coupled with said first pivot member being secured at a fixed distance from the cutting reel axis for maintaining the idler gear in mesh with the drive gear when the driven gear shifts relative to the drive gear, a second pivot member adapted to pivot about the driven gear axis of rotation, said idler gear being operatively coupled with said second pivot member for being held at a fixed distance from the driven gear axis of rotation for maintaining the idler gear in mesh with the driven gear when the driven gear shifts relative to the drive gear, and the second pivot member operatively fixes the distance of the idler gear from the driven gear axis of rotation for maintaining the idler gear in meshed engagement with the driven gear as the driven gear shifts relative to the drive gear.

9. The invention of claim 8, wherein the brush further includes a central shaft which rotates about the driven gear axis of rotation during operation, and said driven gear is fixed with said central shaft.

10. The invention of claim 9, wherein the position of the brush relative to the roller is adjustable to compensate for wear of bristles on the brush, and said driven gear shifts relative to the drive gear when the position of the brush is adjusted as the bristles wear.

* * * * *